Patented Sept. 12, 1939

2,172,590

UNITED STATES PATENT OFFICE 2,172,590

PROCESS FOR THE SEPARATION AND PURIFICATION OF CARBONYL COMPOUNDS

Karl Miescher, Riehen, and Werner Fischer, Basel, Switzerland, assignors to the firm Society of Chemical Industry in Basle, Basel, Switzerland No Drawing. Application July 26, 1938, Serial No. 221,436. In Switzerland August 4, 1937

3 Claims. (Cl. 260—397)

Considerable difficulty is experienced in separating and purifying according to known methods, for example by fractional crystallization, the homologous carbonyl compounds and their derivatives obtainable by the degradation directly or in stages of the side chains of steroids. Furthermore no useful separation of the carbonyl compounds from one another can be attained by means of the usual sparingly soluble reagents for the carbonyl group and the separated products always contain a certain quantity of non-carbonyl materials, such as unchanged parent material and intermediate oxidation products. Thus the cyclic carbonyl compounds obtained as main products of the oxidation cannot be isolated quantitatively in this way and the recovery of carbonyl compounds produced as by-products is rendered difficult.

According to this invention the homologous saturated or unsaturated carbonyl compounds obtainable from steroids by side chain degradation can be separated and purified by reaction with carbonyl reagents which contain in addition to the group capable of condensing with the carbonyl group a salt-forming group, or a group capable of conversion into a salt-forming group, followed by separation and subsequent splitting of the condensation products, if the crude or preliminarily purified mixture of such homologous carbonyl compounds is caused to react only partially with the said carbonyl reagent and/or if the condensation products obtained are split by stages.

Mixtures of homologous saturated or unsaturated carbonyl compounds which can be treated by the process of the invention are, for example, those which are produced by the oxidation of the said chains of, for example, cholestanols, cholesterol, stigmasterol, cinchol, sitosterol, ergosterol, bile acids or stereoisomers of these compounds or their halides or hydrohalides, their derivatives such as esters or ethers or the corresponding nuclear carbonyl compounds or their enol derivatives, such as enol esters or enol ethers.

Suitable carbonyl reagents are, for example, basic hydrazides, such as trialkylammonium or pyridinium fatty acid hydrazides or salts thereof, for example trimethylammonium acetic acid hydrazide chloride, or acid hydrazides, such as arylhydrazinesulfonic acids.

The invention permits the separation of the carbonyl compounds from one another since the tendency to condense with the carbonyl reagent used differs in the case of different carbonyl compounds and the tendency of the different condensation products to undergo decomposition also differs. For example, a mixture of ketones may be caused to react at a low temperature with one of the aforesaid basic hydrazides. Thereby the methyl ketones present are converted preferentially into hydrazones whilst the cyclic ketones do not react. The process may be conducted in a particularly simple manner by causing the neutral oxidation mixture to react completely, for example with a basic hydrazide at a raised temperature and, after removing non-carbonyl compounds, extracting the ketones which are liberated at different hydrogen ion concentrations. Thus the hydrazones of the methyl ketones in general decompose even in a weakly acid solution whilst those of the cyclic ketones do not decompose in this medium. The compounds which have reacted and those which have not reacted can be separated in consequence of their different solubilities, for example in solvents such as water, glycerines or glycols on the one hand and ethers, benzene or the like on the other hand, conditioned by the presence or absence of salt-forming groups. The process may also be combined with other methods of separation or purification such as crystallization, conversion into derivatives, selective adsorption and the like.

The invention renders it possible to isolate in a simple manner the very valuable carbonyl compounds formed by incomplete degradation of the side chains and to increase the yield of the cyclic ketones resulting from complete degradation of the side chains.

The following examples illustrate the invention:

Example 1

The neutral fraction resulting from the oxidation of cholesterol-dibromide acetate and subsequent de-bromination is treated in solution in methyl alcohol containing 10 per cent of glacial acetic acid with the chloride of trimethylammonium acetic acid hydrazide by boiling for ½ hour. The solution is then poured into such a quantity of water containing ice that the resulting aqueous solution contains 10-20 per cent of alcohol. 9/10 of the acetic acid is then neutralized with a 2n-solution of sodium carbonate whilst cooling and the non-ketonic fraction is recovered by exhaustive extraction with ether. The mother liquor is then acidified with a solution of tartaric acid until Congo becomes grey. The products liberated are extracted with ether and the ethereal solution is washed with a solution of sodium bicarbonate and with water and is dried by means of sodium sulfate. From the residue of the ethereal extract there are obtained by fractional recrystallization from methanol the nor-cholestenolone acetate melting at 141–142° C. and the acetate of pregnenolone of melting point 146–147° C. in pure form. The mother liquor, acid with tartaric acid, is now acidified with strong hydrochloric acid and again extracted exhaustively with ether. From this ethereal extract is recovered trans-dehydroandrosterone-acetate melting at 170–172° C.

It is also possible to operate in an anhydrous medium by mixing the methyl alcoholic reaction solution of the basic hydrazones with a solvent containing hydroxyl such as glycol, glycerine or the like. The hydrazones dissolve in these solvents whilst the non-ketonic substances can be extracted by means of an agent which does not contain hydroxyl, for example ether. The dissolved hydrazones are then decomposed fractionally in the manner above described.

The separation of the mixture of neutral carbonyl compounds used as starting material can also be effected by partial reaction with the chloride of the trimethyl-ammonium acetic acid hydrazide.

*Example 2*

A methyl alcoholic solution of the neutral fraction of the product of the oxidation of cholestenone with chromic acid, freed from parent material, is mixed with 10 per cent of glacial acetic acid and the chloride of trimethylammonium acetic acid hydrazide. The whole is heated to boiling for ½ hour and then poured into a quantity of ice water, such that the content of alcohol in the resulting aqueous solution does not exceed 20 per cent. A part of the acetic acid is then neutralized and after extraction with ether the solution faintly acid with acetic acid is mixed with a quantity of a tartaric acid solution, such that Congo is just colored grey. By extraction with ether and subsequent crystallisation from dilute alcohol there are obtained pregnendione of melting point 120° C. and nor-cholestene-dione of melting point 128° C. The mother liquor, acid with tartaric acid, is then acidified with strong hydrochloric acid and again subjected to an exhaustive extraction with ether. The ethereal solution is washed with a solution of sodium bicarbonate and with water and dried by means of sodium sulfate. After evaporating the solvent and recrystallisation of the residue from hexane or aqueous alcohol there is obtained pure androstene-dione of melting point 173–174° C.

*Example 3*

The hydroxy-ketone mixture resulting from the oxidation of cholesterol-dibromide acetate and subsequent debromination and saponification is treated in a solution of alcohol containing 10 per cent of glacial acetic acid with the chloride of pyridinium acetic acid hydrazide by boiling for 1 hour. The solution is then poured into such a quantity of water containing ice that the resulting aqueous solution contains 10–20 per cent of alcohol. $\frac{1}{10}$ of the acetic acid is then neutralized with 2n-solution of sodium hydroxide whilst cooling and the non-ketonic fraction is recovered by exhaust extraction with ether. The mother liquor is then mixed with such a quantity of acetic acid that Congo becomes grey. The products liberated which have been extracted with ether are washed neutral and dried. From the residue of the ethereal extract there is obtained after recrystallization from alcohol chiefly the norcholestenolone of melting point 127–128° C. The aqueous mother liquor is now made just acid to Congo with 2n-hydrochloric acid. After working up pregnenolone fractions of melting point 188–193° C. are isolated from the liberated products formed at this acidity.

The mother liquor mixed with concentrated hydrochloric acid is allowed to stand for some time and then subjected to an exhaustive extraction with ether. From this ethereal extract is recovered trans-dehydro-androsterone melting at 142–148° C.

The hydrogen ion concentration may of course also be adjusted with other agents usual for this purpose.

What we claim is:

1. A process for the separation and purification of homologous saturated and unsaturated carbonyl compounds obtainable by the side chain degradation of steroids by reaction with carbonyl reagents containing in addition to the group capable of condensing with the carbonyl group a group selected from the class consisting of a salt-forming group and a group capable of conversion into a salt-forming group, separation and subsequent decomposition of the condensation products, comprising causing the mixture of the homologous carbonyl compounds to react with the aforesaid carbonyl reagents and decomposing the condensation products obtained, characterized by carrying out at least one of these steps partially.

2. A process for the separation and purification of homologous saturated and unsaturated carbonyl compounds obtainable by the side chain degradation of steroids by reaction with carbonyl reagents containing in addition to the group capable of condensing with the carbonyl group a group selected from the class consisting of a salt-forming group and a group capable of conversion into a salt-forming group, separation and subsequent decomposition of the condensation products, comprising causing the mixture of the homologous carbonyl compounds to react with a trialkylammonium fatty acid hydrazide and decomposing the condensation products obtained, characterized by carrying out at least one of these steps partially.

3. A process for the separation and purification of homologous saturated and unsaturated carbonyl compounds obtainable by the side chain degradation of steroids by reaction with carbonyl reagents containing in addition to the group capable of condensing with the carbonyl group a group selected from the class consisting of a salt-forming group and a group capable of conversion into a salt-forming group, separation and subsequent decomposition of the condensation products, comprising causing the mixture of the homologous carbonyl compounds to react with a pyridinium fatty acid hydrazide and decomposing the condensation products obtained, characterized by carrying out at least one of these steps partially.

KARL MIESCHER.
WERNER FISCHER.